Nov. 22, 1955    C. F. OVERBECK    2,724,520
INDUSTRIAL TRUCK
Filed Nov. 16, 1951    5 Sheets-Sheet 1

INVENTOR.
CHARLES F. OVERBECK
BY
*Geo. B. Pitts*
ATTORNEY

INVENTOR.
CHARLES F. OVERBECK
BY
ATTORNEY

Nov. 22, 1955 — C. F. OVERBECK — 2,724,520
INDUSTRIAL TRUCK
Filed Nov. 16, 1951 — 5 Sheets-Sheet 3
FIG. 10
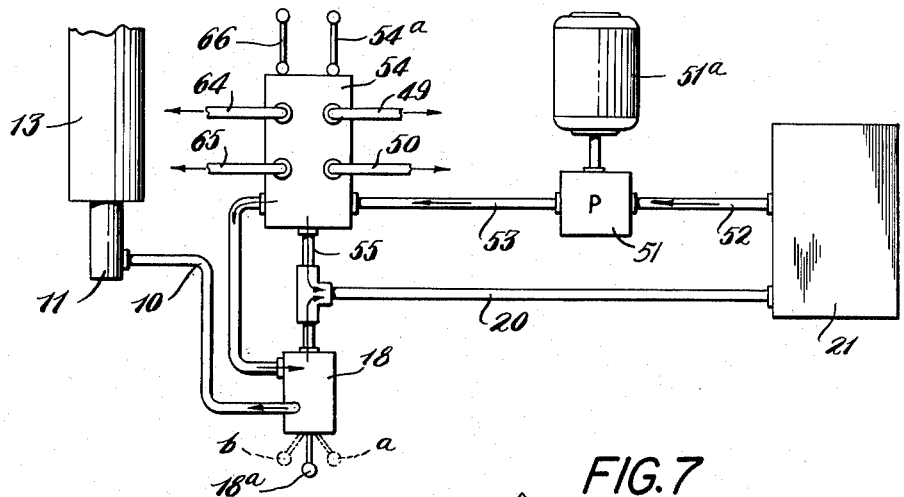
FIG. 7
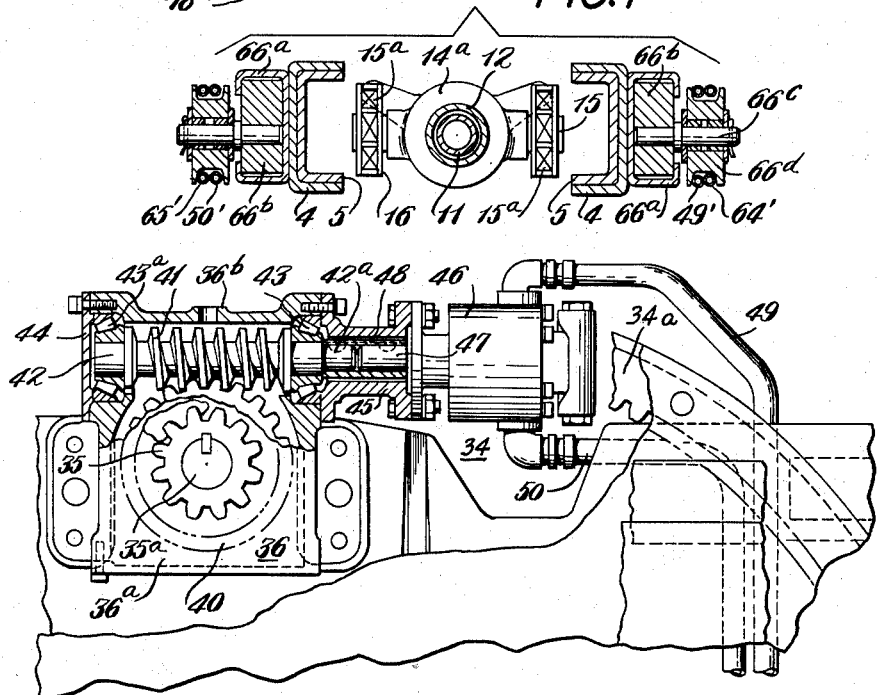
FIG. 3
INVENTOR.
CHARLES F. OVERBECK
BY Geo. B. Pitts
ATTORNEY Nov. 22, 1955     C. F. OVERBECK     2,724,520
INDUSTRIAL TRUCK
Filed Nov. 16, 1951     5 Sheets-Sheet 4
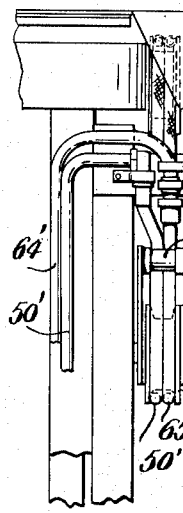
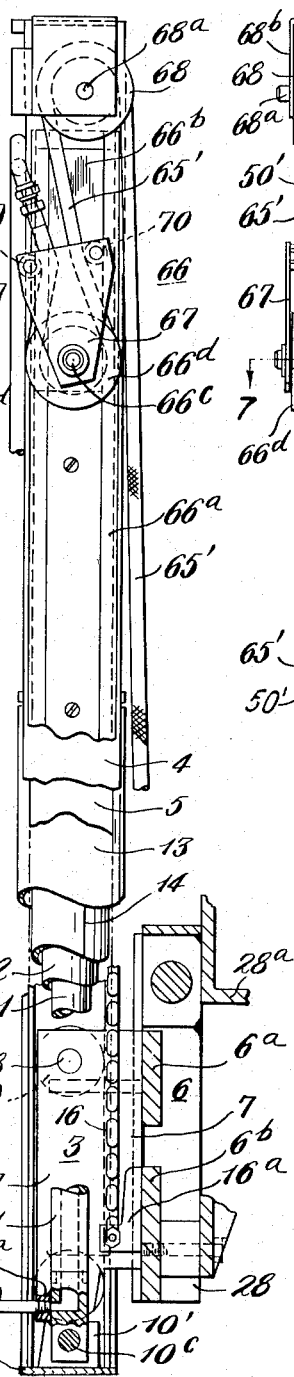
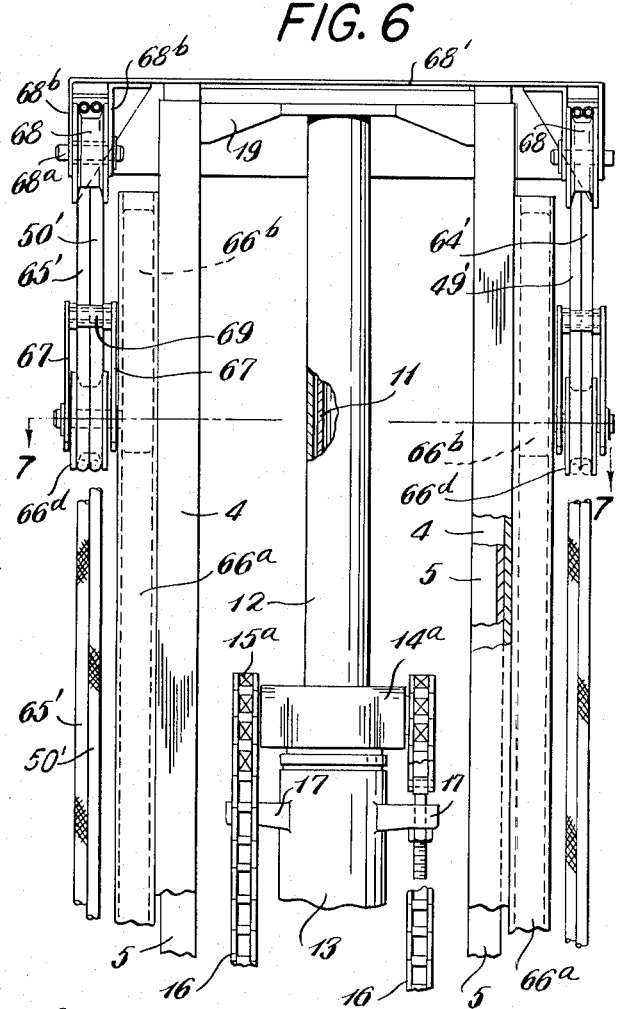
INVENTOR.
CHARLES F. OVERBECK
BY
Geo. B. Pitts
ATTORNEY Nov. 22, 1955 C. F. OVERBECK 2,724,520
INDUSTRIAL TRUCK
Filed Nov. 16, 1951 5 Sheets-Sheet 5
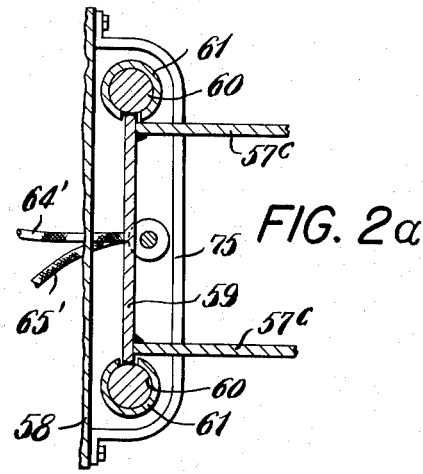
FIG. 2a
FIG. 8
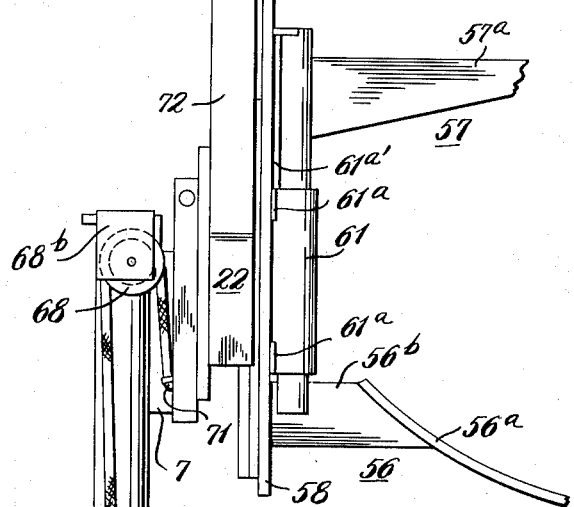
FIG. 9
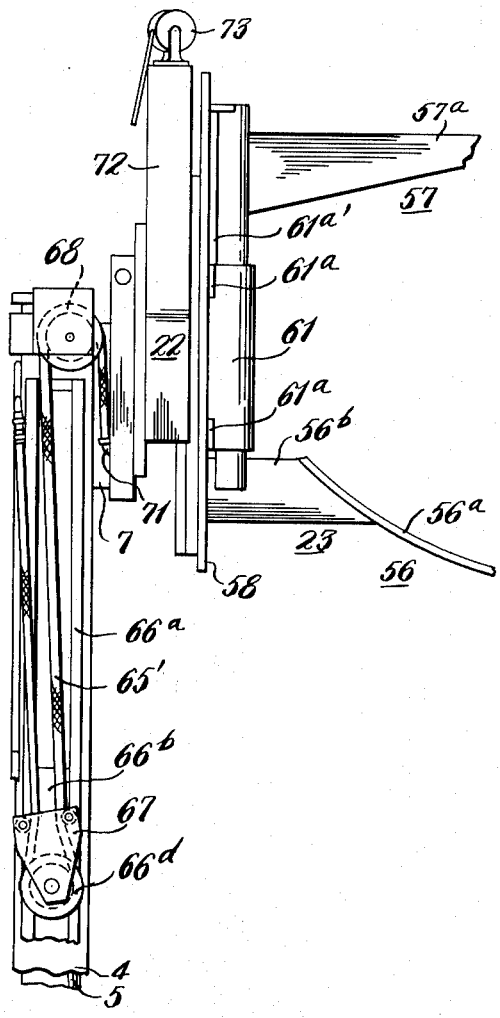
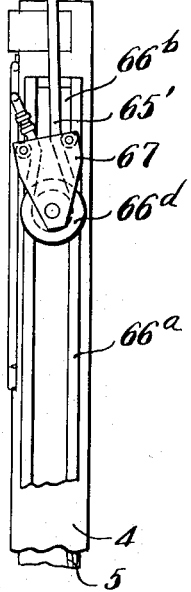
INVENTOR.
CHARLES F. OVERBECK
BY
Geo. B. Pitts
ATTORNEY

United States Patent Office 2,724,520
Patented Nov. 22, 1955

2,724,520
INDUSTRIAL TRUCK

Charles F. Overbeck, Lakewood, Ohio, assignor, by mesne assignments, to The Baker-Raulang Company, a corporation of Delaware Application November 16, 1951, Serial No. 256,719

3 Claims. (Cl. 214—652)

This invention relates to a truck having an elevating member adapted to transport loads and to raise and lower loads, whereby the operations of handling, stacking and transportation thereof, as well as loading of freight cars, trucks and cargo carriers of the airplane type are facilitated. More specifically, the invention relates to a truck having a power operated elevating member, which in turn supports one or more operable mechanisms, each of which is power operated, whereby a single operative, by the manual operation of one or more levers, may carry out a plurality of operations in an economical manner. The power for operating the mechanisms is of a type to insure a simplified construction, the source of supply of the fluid (electrical, liquid or a gas) and its control being mounted on the truck frame. It will be observed that each mechanism or a part thereof is operated to and from predetermined positions and that portions of the power supply connections for each mechanism must be flexible, whereby the elevating member may be moved to and from selected positions without affecting the supply of fluid to the adjacent mechanism. Each of these power supplies therefore consist of two connections, portions of which are flexible, for each power operated mechanism.

The invention herein includes means for supporting the flexible portions of the fluid connections so that during movement of the elevating member, slack or the formation of loops in these flexible portions is eliminated and danger of the latter getting into the path of movement of the elevating member and affecting the operation thereof is avoided.

While the disclosure herein includes an elevating member supporting operable parts, devices or mechanisms each having a power operated member requiring two fluid connections, the invention is equally adapted for use where the elevating member is provided with one operable part, device or mechanism.

The invention may be incorporated with (a) fluid operated means of the single lift type for raising the elevating member, whether the latter supports one or more operable mechanisms and (b) fluid operated means of the multi-stage lift type, whereby the elevating member may be moved a predetermined distance independently of its guides, whether the member supports one or more operable mechanisms. In the single lift type, the fluid operated mechanism operates continuously through a pair of chains, which are connected to the elevator member, to move the latter on its guides the full length provided by the latter, whereas in the multi-stage lift type, in one stage of movement of the elevating member the guides are stationary and the fluid operated mechanism operates through a pair of chains to move the elevating member relative to the guides a predetermined distance and in another stage of movement of the elevating member the guides engaged thereby and the elevating member are moved as a unit to a second or higher position.

One object of the invention is to provide in a truck having guides for an elevating member, which supports fluid operated mechanisms capable of separate or simultaneous operations for handling loads, improved means for supporting the fluid connections leading to the mechanisms while permitting free movement of the elevating member.

Another object of the invention is to provide in a truck, having guides for an elevating member, which supports a fluid operated, load engaging mechanism having connections with a source of fluid supply, portions of the fluid connections for the mechanism being flexible to permit movements of the elevating member endwise of its guides, sets of relatively movable reeving members for supporting the flexible portions of the connections and arranged to eliminate slack therein during movement of the elevating member in one direction.

Another object of the invention is to provide in a truck having an elevating member which supports one or more devices adapted to be operated by fluid, sets of reeving members for the fluid connections arranged to support the latter during movement of the elevating member, each set of members consisting of a stationarily mounted member and a movable member controlled automatically to take up slack in the fluid connections during raising of the elevating member.

Another object of the invention is to provide in a truck having an elevating member which supports a fluid operated, load engaging mechanism having fluid supply connections portions of which are flexible, sets of reeving members for supporting the flexible portions and arranged to take up slack therein during movement of the elevating member in one direction and to pay out the flexible portions during movement of the elevating member in the opposite direction.

Another object of the invention is to provide in a truck having an elevating member and guides therefor, a fluid operated, load engaging mechanism on said member the fluid connections for which are provided with flexible conduits, raising means for the elevating member arranged to move the latter relative to the guides to a predetermined level and thereafter move the elevating member and the guides engaged thereby, as a unit, to a higher level, improved means for supporting the flexible conduits to eliminate slack therein during movement of the elevating member to and from said levels, respectively.

Another object of the invention is to provide in a truck having an elevating member which supports a fluid operated, load engaging mechanism having fluid supply connections portions of which consist of flexible conduits, sets of reeving members mounted on the guides for the elevating member, for supporting the flexible conduits and arranged to take up slack therein during movement of the elevating member in one direction and to pay out the flexible conduits during movement of the elevating member in the opposite direction, each set consisting of an upper member, a lower member and a ponderous device on which the lower member is mounted slidably supported on the adjacent guide.

Another object of the invention is to provide in a truck having an elevating member and guides therefor, a fluid operated, load engaging mechanism on said member, a fluid supply on the truck frame having connections with the load engaging mechanism, contiguous portions of the connections between the truck frame and the mechanism being flexible, raising means for the elevating member arranged to move the latter relative to the guides to a predetermined level and thereafter move the elevating member and the guides engaged thereby as a unit, to a higher level, improved means mounted on certain of the guides for supporting the flexible portions of the connections to eliminate slack therein during movement of the elevating member to and from said levels, respectively.

Other objects of the invention will be apparent to those skilled in the art to which my invention relates from the following description taken in connection with the accompanying drawings, wherein Fig. 1 is a perspective view of a truck having an elevating member provided with fluid operated mechanisms and improved supporting and compensating mechanisms for portions of the fluid connections leading to said mechanisms, embodying my invention;

Fig. 2a is a section on the line 2a—2a of Fig. 2;

Fig. 3 is a fragmentary view partly in section on the line 3—3 of Fig. 2;

Fig. 4 is a fragmentary side elevation (parts being broken away), showing the position of certain parts when the elevating member is in its lowest position;

Fig. 5 is a fragmentary view looking toward the right of Fig. 4;

Fig. 5a is a fragmentary view looking toward the left of Fig. 4;

Fig. 6 is a fragmentary front view of parts shown in Fig. 4;

Fig. 7 is a section on the line 7—7 of Fig. 6;

Fig. 8 is a fragmentary side elevation showing the position of the parts when the elevating member is raised to the limit of its movement relative to the secondary guides;

Fig. 9 is a view similar to Fig. 8 but showing the position of the parts when the elevating member is raised to the limit of its guides; and Fig. 10 is a diagrammatic view of the fluid system.

Figure 1:
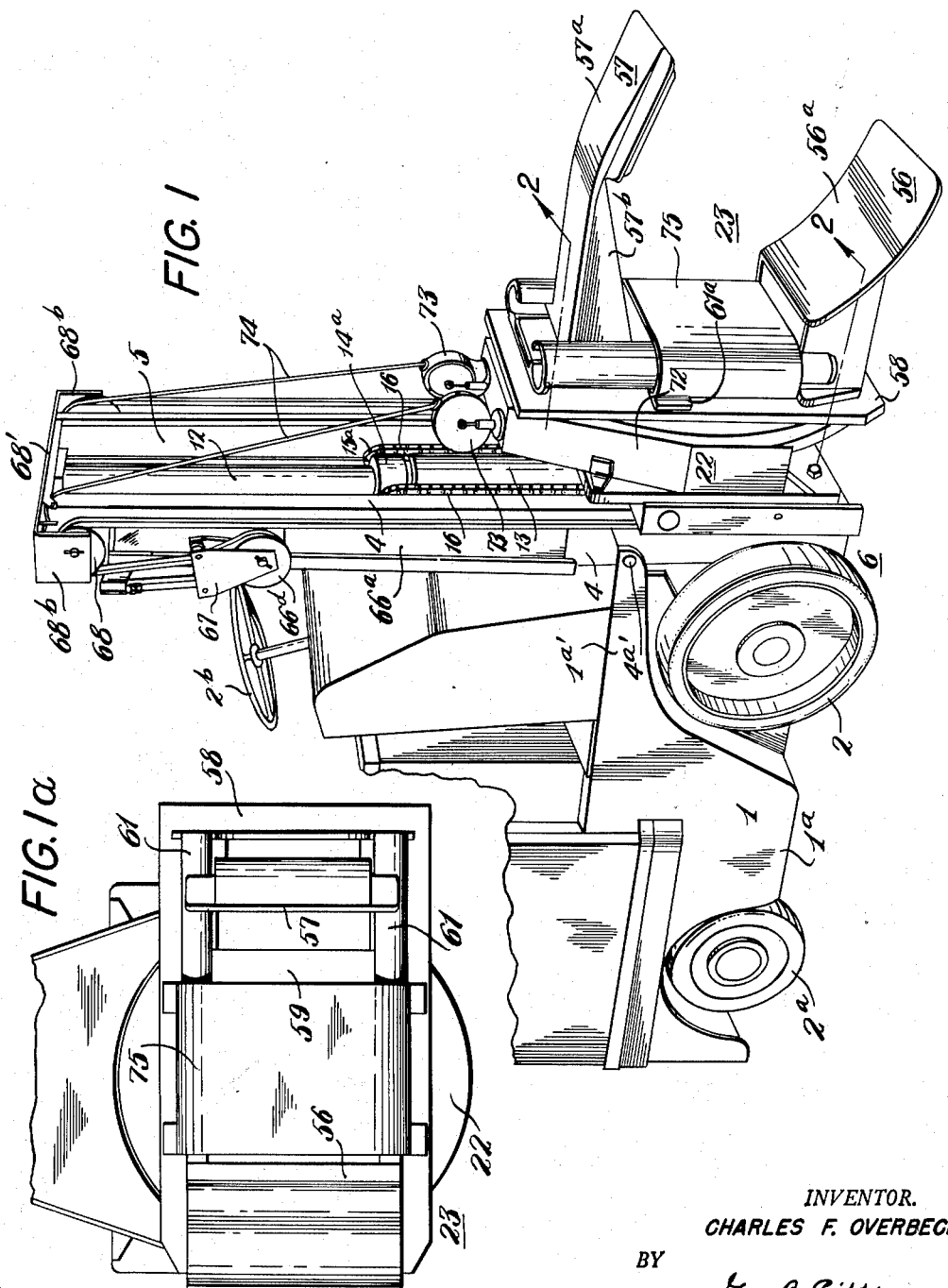
Fig. 1a is a fragmentary front elevation of parts shown in Fig. 1, with the rotatable support and load engaging member turned 90 degrees.

In the drawings, 1 indicates as an entirety a truck having a frame 1a mounted on front and rear pairs of wheels 2, 2a, respectively, one of said pairs of wheels being driven in a well known manner and the other pair being steerably mounted and operated by a steering wheel 2b. At the front end of the frame 1a I provide guide means for an elevating member, indicated as an entirety at 3 (see Figs. 2 and 4). The guide means consist of a pair of main guides 4 connected at their lower ends by a base 4a and a pair of secondary guides 5 slidably mounted in the guides 4. The guides 4 and 5 are of channel shape in cross section, the latter guides slidably fitting within the main guides as shown in Fig. 7. The guides 4 are swingably mounted on trunnions 4a' (one only being shown) mounted on the frame extensions 1a'. By employment of a trunnion mounting for the guides 4, the latter and all parts mounted therein may be tilted rearwardly and forwardly by suitable mechanism (not shown) as is customary in the trucks of the elevating type shown herein. The elevating member 3 consists of a frame 6 having cross members 6a, 6b, to which are secured inwardly extending brackets 7, 7. The brackets 7 support upper and lower laterally extending stud shafts 8 on which rolls 9 are rotatably mounted, the rolls in turn engaging the guides 5 to movably support the elevating member 3 thereon.

The elevating member 3 is moved to selected positions by a suitable mechanism, preferably of the hydraulic type, consisting of the following: 10 indicates a supply pipe leading from a source of liquid supply under pressure, as later set forth. The pipe 10 is connected to a duct 10a, which in turn is connected to the lower end of a hollow member 11. The hollow member 11 is suitably supported on the base 4a, such support preferably consisting of spaced brackets 10' fixed to the base 4a midway the guides 4 and a cross member 10c (on which the member 11 is supported) mounted at its opposite ends in the brackets 10'. The hollow member 11 extends upwardly from the support approximately to the upper end of the guides 4. 12, 13, 14, indicate inner, outer and intermediate telescopically related cylindrical members, respectively, disposed concentrically to each other and the hollow member 11 for endwise movement relatively to the latter. The walls of the hollow member 11 and inner member 12 are formed with ports through which the liquid under pressure flows, the members 12, 13, 14, being provided internally with annuli so that they operate as cylinder-piston couples to effect relative movement of the members, as later set forth. The intermediate member 14 extends upwardly beyond the upper end of the outer member 13 and is provided with a collar 14a having diametrically disposed outwardly extending shafts 15 on which sprockets 15a rotate. The sprockets 15a are engaged by chains 16, the inner ends of which are adjustably anchored to lugs 17 provided on the outer member 13 adjacent its upper end. The opposite ends of the chains 16 are suitably connected to brackets 16a on the inner side of the cross bar 6b (see Fig. 4). The elevating member 3 is operated upwardly and downwardly by the operation of a valve 18 (Fig. 10), which is controlled by a lever 18a. When the lever 18a is moved to position a, liquid under pressure flows through pipe 10 to the hollow member 11 and from the latter into the cylinders, the effect of which is to initially operate the intermediate member 14 and sprockets 15a upwardly. As the inner ends of the chains 16 are anchored, the latter will reeve about the sprockets 15a and raise the elevating member 3 relative to the guides 5 from the position shown in Fig. 1 to the position shown in Fig. 8, thereby completing the initial stage lift of the elevating member 3. In this operation of the elevating member 3 it is to be observed that it is moved endwise of the guides 5 and that the latter remain in normal position, as shown in Fig. 1, so that loading and unloading operations may be carried out where the overhead conditions are limited, for example, in freight cars.

If the lever 18a is maintained in position a, the continued supply of liquid pressure to and through pipe 10 will be applied to the members 12 and 13 and as the inner member 12 is connected at its upper end to the cross member 19, which connects the upper ends of the guides 5 together, the latter will be raised relative to the guides 4 to the position shown in Fig. 9, thereby completing the second stage lift of the elevating member 3. In this latter movement, the guides 5 and elevating member 3 move upwardly as a unit. To lower the guides 5 and elevating member 3, the lever 18a is moved to position b, whereby these parts will gravitate to their normal positions, as shown in Fig. 1, the liquid flowing in the opposite direction through pipe 10, valve 18 and through the return pipe 20 to sump 21.

No claim is made herein to the mechanism for operating the elevating member 3, as set forth above, as I believe Max Lehmann, of East Cleveland, Ohio, to be the sole inventor thereof. The specific form of construction of raising mechanism forms no part of the present invention, since the elevating member may be raised and lowered by mechanism of any desired form of construction.

In the present disclosure, the elevating member 3 supports two fluid operated mechanisms indicated generally at 22, 23, respectively, to show one application of the invention. However, the invention herein set forth is not limited to these illustrated forms or types of mechanisms nor to the employment of two mechanisms, as the invention is equally applicable to the employment and mounting of one fluid operated mechanism on the elevating member. The mechanism 22, which consists of relatively rotatable members, is removably supported on the elevating member, whereas the mechanism 23, which operates to engage and support a load whereby it can be elevated and transported, is mounted on the rotatable member of the mechanism 22.

Figure 2:
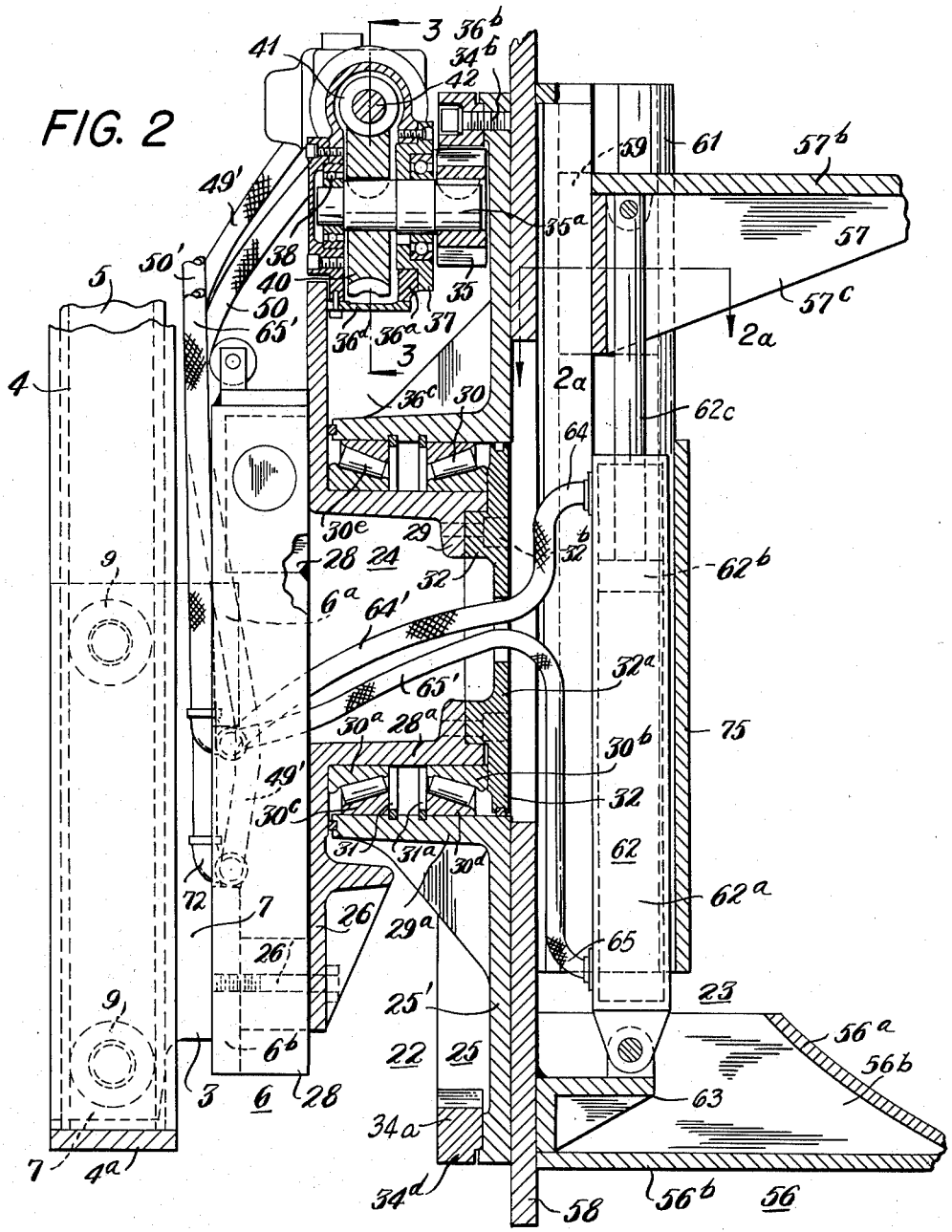
Fig. 2 is a fragmentary section on the line 2—2 of Fig. 1.

The mechanism 22 comprises inner and outer members 24, 25, respectively (see Fig. 2). The inner member 24 consists of an annular plate 26 suitably secured by bolts 26' to the cross bars 6a, 6b, spacers 28 being provided between the inner member 24 and bars 6a, 6b. The inner member 24 is provided with an outwardly extending integral annulus or collar 28a preferably concentric to the axis of the member 24 and having a flange 29, whereas the outer member 25 consists of an annular plate 25' and an inwardly extending integral annulus or collar 29a preferably concentric to the axis of the collar 28a. Either collar may be of a size to telescopically fit within the other collar; in the preferred arrangement, the collar 28a is disposed within the collar 29a. In this arrangement, the opposed walls of the collars 28a, 29a, form seats for the races of anti-friction bearings 30, to rotatably support the outer member 25 on the inner member 24. The bearings 30 preferably consist of inner races 30a, 30b, and outer races 30c, 30d, the race 30a being seated in the angle formed by the member 24 and collar 28a and the race 30c being engaged by a split resilient ring 31 adapted to be locked in an annular groove formed in the inner face of the collar 29a, whereas the race 30b is seated on the collar 28a and held in position by a disk 32, which closes the outer open end of the collar 28a and the race 30d is engaged by a split resilient ring 31a adapted to be locked in an annular groove formed in the inner face of the collar 29a. As shown, the races 30a, 30c and 30b, 30d, engage anti-friction rollers 30e, disposed on reversely extending radii of the axes of the collars 28a, 29a, to maintain the collars 28a, 29a, in operative, rotatable relation. The flange 29 is engaged by the annular wall 32' on the inner face of a disk 32a, which is preferably secured to the flange 29 by countersunk cap screws 32b. The disk 32a is formed with an axial opening 33 for a purpose later set forth.

34 indicates as an entirely power mechanism for rotating the member 25, whereby the mechanism 23 may be moved to and held or supported in load pick-up position, a load picked up, the load elevated to a safe carrying position and transported to the place of discharge. After the load is loaded on the mechanism 23, the latter may be rotated any desired angular distance in either direction (see Fig. 1a), dependent on the shape of the load and/or its contents, to insure safe and expeditious transportation thereof to the place of discharge; also, at the place of discharge the mechanism 23 and load thereon may be rotated any desired angular distance in either direction to any desired position to effect discharge of the load. The power mechanism 34 consists of the following: 34a indicates an internal gear fixed to the inner face of the outer rotatable member 25 by counter-sunk cap screws 34b and meshing with a pinion 35, which is fixed to the outer end portion of a shaft 35a. As shown in Fig. 2, the diameter of the gear 34a is equal to that of the member 25. In this arrangement, the application of the power or torque to rotate the mechanism 23 is at the maximum distance radially of the axis of the member 25 and hence a minimum power supply, commensurate with the weight of the load to be handled, is required. 36 indicates a housing formed of spaced walls 36a connected to an upper hollow member 36b, the inner housing wall 36a having lateral extensions 36c suitably secured to the inner annular member 26 above the collars 28a and 29a. The lower end of the housing 36a is closed by a removable plate 36d. The spaced walls 36a accommodate inserts 37 which support suitable anti-friction bearings 38 for the shaft 35a. 40 indicates a worm gear disposed within the housing 36 and keyed to the shaft 35a between the bearings 38. The worm gear 40 is in mesh with a worm 41 integral with a shaft 42, which is mounted in suitable inner and outer anti-friction bearings 43, 43a, seated in the end walls of the tubular member 36b. The outer bearing 43a is held in position by a cap plate 44, whereas the inner bearing 43a is held in position by a hollow member 45 which is axially related and rigidly secured at one end to the adjacent end of the tubular member 36b. The opposite end of the member 45 is rigidly secured to a housing 46 for a suitable motor. As shown in Fig. 3, the inner end 42a of the shaft 42 and the outer end 47 of the shaft for the motor extend into the hollow member 45 and both shaft ends 42a, 47, fit in and are suitably keyed to the inner walls of a sleeve 48, whereby the motor is drivingly connected to the shaft 42, and through the gearing 41, 40, 35, 34a, to the rotatable supporting member 25. The motor within the housing 46 may be of the electric or fluid driven type. In the employment of the latter type (preferably operated by a suitable liquid supplied under pressure) the motor consists of elements rotatably mounted in suitable bearings provided in the end walls of the housing 46, the inner reduced end of one element being extended and forming the motor shaft 47 (already referred to), which is driven in either direction dependent on the direction of flow of the liquid under pressure, supplied by a pump 51 to either of the pipes 49, 50, when the motor 51a is driven, to rotate the shaft 47. The liquid is drawn from the sump or reservoir 21 through pipe 52 and discharged from the pump 51 through pipe 53 to a valve mechanism 54. The valve 54 is operated by a handle 54a to effect flow of the liquid through either pipe 49, 50, to the motor and return flow through the other pipe and discharge of the liquid through pipes 55 and 20 to the reservoir 21.

From the foregoing description it will be observed that power to rotate the mechanism 23 is transmitted through a shaft to a worm and worm gear and the latter is drivingly connected to a gear of maximum diameter. Thus, a simplified construction of power unit is provided, capable of being driven in either direction by a uniform supply of energy and the applied power is transmitted through gear elements (worm and worm gear) which serve to eliminate jerks and vibrations to the load during operation thereof and when the motor is stopped, the mechanism is locked by these elements against rotative movement and hence separate mechanical or other means to lock the mechanism are not required.

No claim is made herein to mechanism 22 and the driving means therefor, as I believe the said Max Lehmann to be the sole inventor thereof.

The mechanism 23 comprises the following: 56, 57, indicate relatively movable opposed members adapted to engage under pressure the opposite sides of a load, such as a container, bale of material, cartons and the like, whereby loads may be raised and lowered and transported. The load engaging and carrying member 56 consists of an outer wall 56a and side walls 56b, the latter being secured to the lower end portion of a plate 58. The plate 58 is removably secured to the rotatable member 25 in any desired manner and formed with an opening 58a for a purpose later set forth. The outer wall 56a is preferably of arcuate shape in cross section, but may be of a different shape dependent on that of the loads to be handled. The load engaging member 57 consists of an outer load engaging section 57a in opposed relation to the load engaging wall 56a of the member 56 and an inner section 57b having side walls 57c fixed at their inner ends to a slide 59. As shown in Fig. 2a, the opposite side edges of the slide 59 are welded to plungers or bars 60 which are endwise movable within spaced parallel guide-ways 61, preferably of curvilinear shape in cross section. The guide-ways 61 are suitably fixed to the support 53 as shown at 61a. In the illustrated mounting for the load engaging member 57 it moves toward and from the member 56 when operated to clamp a load on the member 56 and disengage the load when the latter is to be discharged. Such mounting may be adapted to the employment of an electric motor; but for purposes of illustration and explanation, I show a fluid operated type of operating mechanism consisting of a cylinder-piston unit 62, the cylinder 62a being pivotally mounted at its closed end on a bracket 63 fixed to the support 58. The piston 62b is connected to and reciprocates a rod 62c, the outer end of which is pivotally connected to the load engaging member 57, as shown in Fig. 2. The cylinder 62a is provided at its opposite ends with fluid connections for pipes 64, 65, leading from the valve 54, whereby fluid under pressure may be supplied to either end of the cylinder 62a and discharged from its opposite end by operation of a lever 66. Accordingly, by operation of the member 57 toward the member 56 a load may be clamped between the members 56 and 57 and then raised and transported to a selected place of discharge. Prior to or following transportation of the load to the place of discharge the mechanism 23 may be rotated to another position (see Fig. 1a) by operation of the mechanism 22, dependent on the shape of the load and/or other circumstances.

From the foregoing description it will be observed that in providing two mechanisms 22, 23, a plurality of connections therefor may be provided (four connections being shown); also, as these mechanisms are mounted on the elevating member 3 and move therewith, the inner contiguous sections of the pipes 49, 50, 64 and 65 are flexible, as shown at 49', 50', 64', 65', respectively, and supported on take-up and pay-out mechanisms, each indicated as an entirety at 66, which are mounted on the guides 4. By preference, each mechanism 66 comprises sets of elements mounted on the outer side of the adjacent guide 4, each set by preference supporting and controlling the flexible portion or section of a pipe connected to the motor 46 and the flexible section of a pipe connected to the cylinder 62a. Each set of supporting elements consists of the following: 66a indicates an elongated guide preferably of channel shape in cross section and suitably fixed to the outer side of the adjacent main guide 4. 66b indicates a weight slidably fitting the inner walls of the guide 66a and adapted to counterbalance certain movable parts of the adjacent mechanism 66. The lower end portion of the weight 66b is formed with a transverse opening in which the inner end portion of a shaft 66c is mounted (see Fig. 7); the outer end portion of the shaft rotatably supports a pulley 66d. The pulley 66d is mounted on the shaft 66c between spaced plates 67. 68 indicates a pulley disposed above and in alinement with the pulley 66d and rotatable on a shaft 68a supported at its opposite ends on spaced depending brackets 68b. The outer bracket 68b is bent inwardly as shown at 68' and by preference extends transversely and is integrally connected to the corresponding bracket for the pulley 68 at the opposite side of the guides 4, 5; whereas the inner bracket 68b is bent laterally inwardly at its upper end and suitably fixed to the bent portion 68' of the outer bracket. As shown in Figs. 1, 4, 5 and 6, the extension 68' of the outer bracket 68b is disposed in the path of movement of the guides 5, so that when the latter are raised relative to the guides 4 (the extreme upper position of the elevating member being shown in Fig. 9) the pulleys 66d, 68, are raised to pay out the flexible conduit sections 49', 50', 64', 65'. As shown at the left side of the guides 4 and 5 in Figs. 1, 4 and 6, the flexible pipe portions or hose 50', 65', extend upwardly from the elevating member 3 and reeve around the pulley 68 and extend downwardly between and through guide devices 69, 70, supported between the plates 67 to and around the pulley 66d and by means of releasable connections 71, the hose are connected to the inner portions of the pipes 50, 65, which portions are preferably formed of metal.

As shown in Fig. 2, the flexible pipe portions 49', 50', leading from the motor in the housing 46 and flexible pipe portions 64', 65' (which extend through the opening 33 formed in the plate 32a and collar 28), leading from the cylinder 62a, are connected to joints or couplings 72, which in turn are suitably fixed to the elevating member 3.

From the above description it will be noted that each set of supporting elements 66 accommodates two flexible fluid flow sections, so that where one hydraulically operated mechanism is mounted on the elevating member 3 both flexible flow sections therefor may be mounted on either set of elements; also, where two hydraulically operated mechanisms are mounted on the elevating member, both flexible flow sections for one of the mechanisms may be mounted on one of the sets of elements and both flexible flow sections for the other mechanism may be mounted on the other set of elements.

Operation: Fig. 1 shows the position of the sets of elements comprising the take-up-and-pay-out mechanism 66 when the elevating member 3 is at its down position and the mechanism 23 is in that position when a load on the floor is to be picked up or when a load on the mechanism 23 is to be discharged on the floor. In this position the counter-balance weight 66b is at the upper end of its guide 66a and pulley 66d is at the upper end of its movement (Fig. 4). If fluid pressure is supplied to the hollow member 11, the elevating member 3 and mechanisms 22, 23, thereon will be elevated to the position shown in Fig. 8 relative to the guides 4 and 5; in such vertical movement of the elevating member 3, the flexible hose sections 49', 50', 64', 65', adjacent the elevating member 3 will be carried up therewith and relieve tension on and pay out the contiguous hose sections supported on the pulleys 68—68, 66d—66d, whereas the latter sections (due to downward movement of the weights 66b and pulleys 66d under the influence of gravity) will reeve around the pulleys 68—68, 66d—66d, the movement of the pulleys 66d—66d away from the pulleys 68—68 serving to take up slack in the payed-out sections; if the elevating member 3 is lowered from the Fig. 8 position to the Fig. 1 position, the contiguous flexible hose sections will reeve on the pulleys 66d—66d, 68—68, in the opposite direction and the weights 66b and pulleys 66d—66d will move upwardly to the Fig. 1 position. If the supply of fluid pressure to the hollow member 11 is continued after the elevating member 3 has reached the elevated position shown in Fig. 8, the elevating member and guides 5 will be raised together, thereby raising the mechanism 23 to a higher level, pull will be exerted on the flexible hose portions or sections, the effect of which will be to reeve the flexible hose portions around the pulleys 66d and thereby raise the latter and weights upwardly, the uppermost position of these parts being shown in Fig. 9. In the downward movement of the elevating member 3 from the Fig. 9 or an intermediate position above that shown in Fig. 8, the sets of pay-out-and-take-up elements move reversely to that above set forth. From the foregoing description it will be observed that the weights co-operate with the vertical movements of the elevating member 3 and guides 5 to effect pay-out and take-up of the contiguous portions of the flexible hoses. Also, by mounting the flexible hoses on the outer sides of the guides 4, the mechanism 66 (a) may be readily assembled independently of the raising means, (b) are accessible for servicing and (c) the vision of the driver in effecting load pick-up and discharge operations is not impaired.

72' indicates a housing for a portion of the mechanism 22 and 73 indicates casings, each mounted on a standard rotatably supported on the housing 72'. Each of the casings encloses and rotatably supports a drum on which an electric wire 74 winds and unwinds due to raising and lowering of the elevating member 3. The wires are connected at their inner ends to a source of electric current supply and, by means of brushes and wires leading to suitable limit switches (not shown), movement of the member 25 in either direction to and from a predetermined angular position is automatically controlled. 75 indicates a guard for protecting the mechanism 23.

From the foregoing description it will be observed that each of the mechanisms 22, 23, and the means for operating it or parts thereof may be of any desired construction and operated by a fluid supplied from a source of supply and where either or both mechanisms are electrically operated the electrical connections to the motor or motors will consist of suitable electrical conductors, sections of which will be flexible and mounted on compensating take-up and pay-out elements as herein illustrated and described. It will therefore be observed that the compensating mechanisms at opposite sides of the guides, or either thereof, may be employed to support and automatically take up and pay out flexible connections leading to the mechanism or mechanisms on the elevating member dependent on the type of power means thereof.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A self-propelled truck having, in combination, spaced main guides mounted on the truck frame, separate guides movable endwise on said main guides, an elevating member movable on said separate guides, a fluid operated mechanism mounted on said elevating member, mechanism for initially raising said elevating member and said mechanism relative to said separate guides to position said mechanism at a predetermined level and thereafter raise said separate guides and said mechanism relative to said main guides to position said mechanism at a higher level, said mechanism comprising a cylinder-piston unit, a source of fluid under pressure supply adapted to be mounted on the truck and including a fluid flow conduit connected to one end of said cylinder, an intermediate portion of said conduit being flexible, and a separate mechanism for paying-out and taking-up slack in the flexible section during vertical movements of said elevating member and said separate guides, said separate mechanism comprising a reeving element for said flexible section mounted on the upper end of one of said separate guides, an auxiliary guide mounted on and extending longitudinally of the adjacent main guide, a ponderous member movably engaging said auxiliary guide for movement longitudinally thereof and normally disposed at the upper portion of said auxiliary guide, a separate reeving element for the flexible section mounted on said ponderous member and movable downwardly by the latter for taking up slack in said flexible member as said elevating member is raised relative to said separate guides to the predetermined level, the raising of the separate guides to position said elevating member at a higher level serving to raise said separate reeving element and said ponderous member, whereby the flexible member is payed out as said elevating member moves upwardly to the higher level.

2. A truck as claimed in claim 1, wherein are provided separate fluid flow conduits connected respectively to opposite ends of said cylinder, each conduit having an intermediate flexible section and a paying-out and taking-up mechanism is mounted on the outer sides of each main guide and the adjacent separate guide arranged to pay out and take up slack in one of said flexible sections.

3. A truck having, in combination, spaced main guides on the truck frame, separate guides movable endwise of said main guides, an elevating member movably mounted on said separate guides, a mechanism on said elevating member adapted to support a load and comprising a fluid operated motor having fluid supply and discharge conduits connected to a fluid under pressure supply adapted to be mounted on the truck, intermediate contiguous sections of said conduits being flexible, means for raising said elevating member relative to said separate guides to raise said mechanism to one level and thereafter raise said separate guides to raise said mechanism to a higher level, and a separate mechanism mounted on one of said main guides and the adjacent separate guide and controlled by the vertical movements of said elevating member and said separate guides for paying out and taking up slack in said flexible sections, said separate mechanism comprising an auxiliary guide fixed to and extending longitudinally of one of said main guides, upper and lower rotatable elements around which said flexible sections reeve and a ponderous member on and normally disposed at the upper end of said auxiliary guide and movable longitudinally thereof, said upper reeving element being mounted on and movable with the adjacent separate guide and said lower reeving element being mounted on and movable with said ponderous member, said ponderous member being arranged to gravitate downwardly during raising of said elevating member relative to said separate guides, whereby said lower reeving element takes up slack in said flexible flow sections and said upper reeving element, during raising of said separate guides relative to said main guides, to raise said lower reeving element and said ponderous member, whereby pay-out of said flexible sections takes place.

References Cited in the file of this patent

UNITED STATES PATENTS

| 2,375,337 | Wilson | May 8, 1945 |
| 2,457,366 | Guerin | Dec. 28, 1948 |
| 2,528,401 | Ulinski | Oct. 31, 1950 |
| 2,596,477 | Frischmann et al. | May 13, 1952 |
| 2,599,524 | Lehmann | June 3, 1952 |
| 2,611,498 | Broersma | Sept. 23, 1952 |

FOREIGN PATENTS

| 329,460 | Great Britain | May 22, 1930 |